United States Patent [19]

Pass

[11] 4,262,422

[45] Apr. 21, 1981

[54] FOLDER TYPE LETTERING GUIDE

[76] Inventor: James S. Pass, 165 Tartan Dr., Rochester, Mich. 48063

[21] Appl. No.: 76,982

[22] Filed: Sep. 20, 1979

[51] Int. Cl.$^3$ ........................ B43L 13/02; G09B 11/02

[52] U.S. Cl. .................................. 33/41 B; 33/174 B; 434/162

[58] Field of Search .................... 33/1 B, 41 B, 174 B, 33/485; 35/36, 37, 38

[56] References Cited

U.S. PATENT DOCUMENTS

| | | | |
|---|---|---|---|
| 1,353,279 | 9/1920 | Schulthess | 35/37 |
| 2,016,985 | 10/1935 | Carlson | 35/37 |
| 2,375,427 | 5/1945 | Mannino | 33/1 B |
| 2,693,035 | 11/1954 | Beck | 33/174 B |
| 4,060,901 | 12/1977 | Jamerson | 33/41 B |

FOREIGN PATENT DOCUMENTS

| | | | |
|---|---|---|---|
| 6353 | of 1906 | United Kingdom | 35/36 |
| 294822 | 8/1928 | United Kingdom | 33/174 B |

*Primary Examiner*—Richard R. Stearns

*Attorney, Agent, or Firm*—Cullen, Sloman , Cantor, Grauer, Scott & Rutherford

[57] ABSTRACT

A lettering guide comprises a folder includinng a strip of material, preferably plastic and transparent, folded over to provide a bottom support sheet and an overlying top hold-down sheet, and defining an upright fold edge and an adjacent upright margin area. An elongated slot of uniform height is cut through the top sheet extending to the margin area and of a length less than the width of the top sheet. The slot extends at right angles to the fold edge. A paper sheet may be snugly interposed and retained between the top and bottom sheets in registry with the fold edge. The paper sheet is adapted to be lettered in a straight line through the slot throughout its height, the line of letters extending at right angles to the fold edge. Successive lines of lettering may be applied to the paper sheet upon successive advancement thereof at right angles to said slot. The lines of lettering are all parallel, uniformly spaced and extend at right anngles to the edge of the paper sheet.

3 Claims, 3 Drawing Figures

FOLDER TYPE LETTERING GUIDE

BACKGROUND OF THE INVENTION

Heretofore there has existed the problem of applying lettering of uniform height to a sheet of paper and wherein the line of lettering extends at right angles to an edge thereof and wherein successive lines of lettering are uniformly spaced from and parallel to the first line of lettering. Lettering in a straight line has heretofore been achieved to a limited extent by lettering along a straight edge of another object. The use of such a lettering device or the use of a slotted lettering device applied to a sheet nevertheless does not accurately determine that the line of lettering extends at right angles to the edge of the paper sheet and that successive lines will all be parallel thereto, and uniformly spaced.

SUMMARY OF THE INVENTION

It is an object of the present invention to provide a lettering guide in the form of a folder having a fold edge and wherein an elongated slot of uniform height is formed through the top of the folder and extends at right angles to the edge of the folder to assure that a line of lettering applied to a paper sheet interposed within the folder and extending to the fold edge will be of uniform height and at the same time extend at right angles to the edge of said sheet of paper.

It is a further object to provide a folder type of lettering guide preferably of a plastic material and transparent and adapted to snugly and supportively receive a sheet of paper therebetween to be lettered and wherein the top of the folder has formed therein one or more spaced elongated slots of uniform but different heights respectively, for selective use depending upon the desired height of a line of lettering to be applied to a sheet of paper interposed within said folder.

It is a further object to provide a lettering guide comprising a folder which includes a strip of material, preferably plastic and transparent, folded over and providing a bottom support sheet and an overlying top hold-down sheet and defining an upright fold edge. An upright margin area is provided in the top sheet adjacent the fold edge. An elongated slot of uniform height is formed through the top sheet and extends to the margin area and is of a length less than the width of the top sheet. Said slot extends at right angles to the fold edge. The top and bottom sheets are adapted to snugly and frictionally receive therebetween a rectangular sheet of paper to be lettered and wherein one sheet edge extends to and is in registry with the fold edge whereby the sheet of paper is adapted to be lettered in a straight line through said slot throughout its height, said line of lettering extending at right angles to the fold edge and whereby on advancing said paper sheet along said fold edge relative to said top and bottom sheets, additional lines may be lettered thereon, all parallel to the first line of lettering, and the resulting lines of lettering being all at right angles to one edge of the sheet.

It is another object to provide a second slot of uniform height spaced from and of a different height from said first slot, formed through said top sheet and extending to said margin area and of a length corresponding to the first slot, said second slot extending at right angles to said fold edge and adapted for selective use depending upon the height of lettering desired.

A further object of the invention is to provide a scale upon and along the margin area substantially throughout its height consisting of uniformly spaced indicia with which the adjacent edge of the paper sheet progressively registers for the uniform spacing of successive lines of lettering through the preselected slot.

It is a further object to provide a portion of the top sheet below its top edge with a portion cut away from the margin area along a straight line which extends at right angles to the fold edge whereby the underlying sheet of paper may be lettered therealong in a straight line with the height of the letters variably different as determined by the user.

These and other objects will be seen from the following specification and claims in conjunction with the appended drawing.

THE DRAWING

It will be understood that the above drawing illustrates merely a preferred embodiment of the invention, and that other embodiments are contemplated within the scope of the claims hereafter set forth.

DETAILED DESCRIPTION OF AN EMBODIMENT OF THE INVENTION

Figure 3:
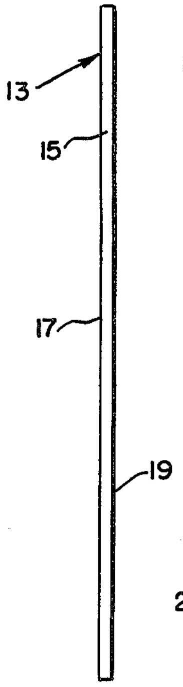
FIG. 3 is a left side elevational view thereof.
Figure 1:
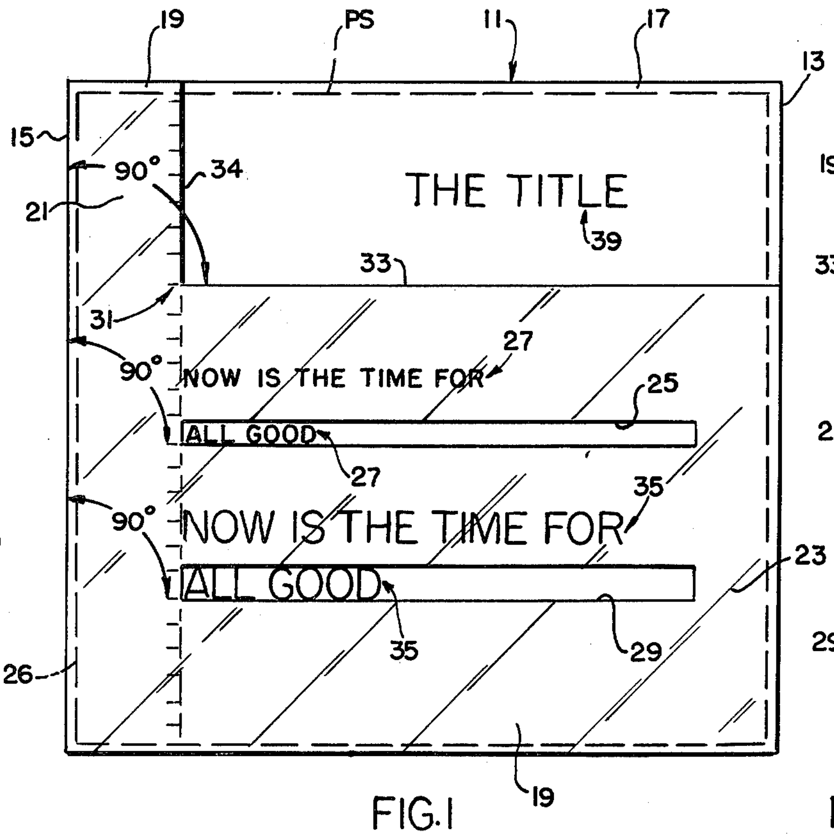
FIG. 1 is a front elevational view of the present lettering guide folder with a sheet of paper interposed therein designated in dash lines.

The present lettering guide 11, FIG. 1, comprises a folder which includes an elongated rectangular strip 13 preferably of plastic material although it could be made of paper and which is preferably transparent.

Figure 2:
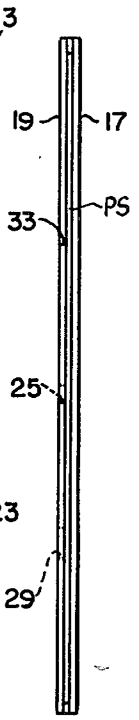
FIG. 2 is a right side elevational view thereof.

Said strip is folded over itself providing a bottom support sheet 17 and an overlying top hold-down sheet 19. The folding over of said strip defines along one edge thereof the upright fold edge 15 with the top sheet 19 superimposed over bottom support sheet 17 as shown in FIG. 2. A first upright margin area 21 of a generally rectangular shape, extends throughout the height of the top sheet and is arranged parallel and adjacent to fold edge 15.

Upon the opposite side of the top sheet there is provide a second upright margin area 23 of a generally rectangular shape parallel to and extending along the edge thereof designated at 23.

Elongated first slot 25 of a first uniform height is cut or formed through top sheet 19, extends between the margin areas 21 and 23 and thus is of a length less than the width of said top sheet. Said slot has a longitudinal axis which extends at right angles to fold edge 15.

A rectangular paper sheet to be lettered is designated at PS, is shown in dash lines nested within said folder resting upon bottom support sheet 17 and snugly and frictionally retained in position by the top holddown sheet 19.

When the present guide is ready for use the paper sheet PS is projected so that its upright one edge 26 is in cooperative engaging registry with the interior of the fold edge 15 to provide for proper orientation of the paper sheet.

The paper sheet is adapted to be lettered in a straight line through the first slot 25 to produce the line of lettering 27 of uniform height corresponding to the height of slot 25. The line of lettering 27 extends at right angles to the fold edge 15 and paper edge 26. By longitudinal advancement of the paper sheet transversely along said fold edge such as to the position shown, the second line of lettering 27 formed through the slot 25 is of the same height as the first line of lettering, also extends at right angles to the fold edge and the paper edge 26 and is therefore parallel to the first line of lettering 27.

Assuming that all lines of lettering are to be of uniform height, the slot 25 may be used by progressively advancing the paper sheet PS along the length of the fold edge 15 and in successive registry with the scale 31 having indicia to designate quarter inch intervals, for illustration.

A second elongated slot 29 of uniform height is spaced from slot 25 and is of a second distinct height than slot 25. Said second slot is cut or formed through the top sheet 19, extends adjacent to the respective margin areas 21, 23 also is at right angles to the fold edge 15 and therefore parallel to slot 25.

In the illustrative embodiment the slot 25 is ⅛ inch in height for illustration and the second slot 29 is 3/16 inch in height for illustration, both slots being rectangular.

Suffice it to say that slots 25,29 are spaced from each other, and have longitudinal axes which are parallel and both extend at right angles to the fold edge 15.

Accordingly whichever slot 25 or 29 is used, or both thereof, the lettering defined by the respective slot extends in lines which are perfectly straight and are equally spaced from each other and extend at right angles to the fold edge 15, and at right angles to the paper sheet edge 26.

The lines of lettering which are provided for by use of the slot 29 are designated at 35 upon the paper sheet PS.

Top sheet additionally has a cut out portion along lines 33 and 34, FIG. 1, to provide a guide for lettering as at 33 for application of a title on top line of lettering such as shown at 39. Said cut out portion has a top edge 33 which is disposed substantially below the top edge of bottom support sheet 17. Here the letters may be of varying heights as determined by the user but wherein the title or other top line of lettering is initially in registry with the cut away line 33 and extends in a straight line parallel to the other lines of lettering 27 and 35 and is at right angles to the fold edge 15 and paper edge 26. The cut away line 34 extends to cut away line 33 and coincides with the edge of margin area 21. Thus the underlying sheet of paper may be easily grasped for relative movement within the folder along folder edge 15.

With this detailed description of the specific apparatus used to illustrate the preferred embodiment of the present invention and the operation and use thereof, it will be obvious to those skilled in the art that various modifications can be made in the present invention without departing from the spirit and scope thereof which is limited only by the appended claims.

I claim:

1. A lettering guide comprising a folder including a strip of material folded over itself to provide a bottom support sheet, an overlying top hold-down sheet, and an upright fold edge contiguous to and defined at the intersection of said bottom support sheet and said top hold-down sheet, said top hold-down sheet including an upright margin area of a generally rectangular shape parallel to and contiguously adjacent said upright fold edge, said top hold-down sheet further including an elongated slot having a first uniform height, said elongated slot being formed through said top hold-down sheet and extending adjacent to said margin area so as to have a length less than the width of said top hold-down sheet, said elongated slot having a longitudinal axis extending at right angles to said upright fold edge, said overlying top hold-down sheet and said bottom support sheet being adapted to snugly and frictionally receive therebetween a rectangular sheet of paper to be lettered such that one edge of said paper sheet extends to and is in cooperative registry with said upright fold edge for insuring that a first line of lettering written onto said paper sheet through said elongated slot throughout its uniform height will be lettered in a straight line, said straight line of lettering extending at right angles to said upright fold edge and said one edge of said paper sheet and whereby on advancing said paper sheet along said upright fold edge relative to said top and bottom sheets, additional lines may be lettered thereon with all such additional lines being parallel to said first line of lettering and at right angles to said one edge of the paper sheet;

said top hold-down sheet including a cut out portion adjacent to said margin area and having a top edge which is disposed substantially below the top edge of said bottom support sheet, said top edge extending at right angles to said upright fold edge whereby the underlying sheet of paper may be easily grasped for relative movement within said folder along said upright fold edge and wherein said sheet of paper may be lettered therealong with the height of the letters being selectively variably different as determined by the user.

2. In the lettering guide of claim 1, said top hold-down sheet including an elongated second slot of a second different and distinct uniform height spaced apart from said elongated first slot, said second elongated slot being formed through said top sheet and extending adjacent to said margin area, said second elongated slot having a longitudinal axis extending at right angles to said upright fold edge and being parallel to the longitudinal axis of said first elongated slot.

3. A lettering guide comprising a folder including a strip of material folded over itself to provide a bottom support sheet, an overlying top hold-down sheet, and an upright fold edge contiguous to and defined at the intersection of said bottom support sheet and said top hold-down sheet, said top hold-down sheet including an upright margin area of a generally rectangular shape parallel to and contiguously adjacent said upright fold edge, said top hold-down sheet further including an elongated slot having a first uniform height, said elongated slot being formed through said top hold-down sheet and extending adjacent to said margin area so as to have a length less than the width of said top hold-down sheet, said elongated slot having a longitudinal axis extending at right angles to said upright fold edge, said overlying top hold-down sheet and said bottom support sheet being adapted to snugly and frictionally receive therebetween a rectangular sheet of paper to be lettered such that one edge of said paper sheet extends to and is in cooperative registry with said upright fold edge for insuring that a first line of lettering written onto said paper sheet through said elongated slot throughout its uniform height will be lettered in a straight line, said straight line of lettering extending at right angles to said upright fold edge and said one edge of said paper sheet and whereby on advancing said paper sheet along said upright fold edge relative to said top and bottom sheets, additional lines may be lettered thereon with all such additional lines being parallel to said first line of lettering and at right angles to said one edge of the paper sheet;

said top hold-down sheet including an elongated second slot of a second different and distinct uniform height spaced apart from said elongated first slot, said second elongated slot being formed through said top sheet and extending adjacent to said margin area, said second elongated slot having a longitudinal axis extending at right angles to said upright fold edge and being parallel to the longitudinal axis of said first elongated slot;

said top hold-down sheet including a cut out portion adjacent its top edge to allow said sheet of paper to be easily grasped for relative movement within said folder along said upright fold edge, a scale of indicia uniformly spaced along said margin area and parallel to said upright fold edge to permit uniform spacing of successive lines of lettering through said elongated slots parallel to said first elongated slot, each slot having a distinct uniform height to permit lettering of different heights depending upon the slot chosen.

* * * * *